(12) United States Patent
Miyoshi et al.

(10) Patent No.: US 7,605,204 B2
(45) Date of Patent: Oct. 20, 2009

(54) RESIN COMPOSITION EXCELLENT IN STABILITY TO FACE IMPACT

(75) Inventors: Takaaki Miyoshi, Kimitsu (JP); Makoto Doki, Sodegaura (JP); Shu Keat Ooi, Sodegaura (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 145 days.

(21) Appl. No.: 10/572,402

(22) PCT Filed: Sep. 17, 2004

(86) PCT No.: PCT/JP2004/013653

§ 371 (c)(1),
(2), (4) Date: Oct. 2, 2006

(87) PCT Pub. No.: WO2005/028559

PCT Pub. Date: Mar. 31, 2005

(65) Prior Publication Data
US 2007/0043154 A1 Feb. 22, 2007

(30) Foreign Application Priority Data
Sep. 18, 2003 (JP) .............................. 2003-325686

(51) Int. Cl.
*C08L 53/02* (2006.01)
(52) U.S. Cl. ..................... 524/413; 524/505; 525/88; 525/92 B; 525/92 D; 525/98
(58) Field of Classification Search .................. 525/88, 525/92 B, 92 D, 98; 524/413, 505
See application file for complete search history.

(56) References Cited

U.S. PATENT DOCUMENTS 4,857,575 A   8/1989  Van der Meer et al.

6,572,721 B1 * 6/2003 Ito et al. ...................... 156/196
2003/0134963 A1 * 7/2003 Miyoshi et al. .............. 524/495
2004/0157978 A1 * 8/2004 Nakagawa et al. .......... 524/495

FOREIGN PATENT DOCUMENTS

| EP | 0747436 | 12/1996 |
|---|---|---|
| JP | 63-92668 | 4/1988 |
| JP | 5-295250 | 11/1993 |
| JP | 5-306368 | 11/1993 |
| JP | 6-157894 | 6/1994 |
| JP | 6-287446 | 10/1994 |
| JP | 8-217972 | 8/1996 |
| JP | 8-319385 | 12/1996 |
| JP | 2001-503463 | 3/2001 |
| JP | 2002-338805 | 11/2002 |
| JP | 2003-64255 | 3/2003 |
| JP | 2003-277602 | 10/2003 |
| WO | 02/094936 | 11/2002 |

OTHER PUBLICATIONS

Supplementary European Search Report issued in corresponding European Patent Application No. 04787903.6.

* cited by examiner

*Primary Examiner*—Jeffrey C Mullis
(74) *Attorney, Agent, or Firm*—Staas & Halsey LLP (57) ABSTRACT

A polyamide-polyphenylene ether based resin composition containing 1 to 20 mass ppm of copper and 0.1 to 2 mass % of titanium dioxide and/or carbon black, wherein a dispersed phase containing polyphenylene ether or polyphenylene ether and a partially hydrogenated block copolymer dispersed in the polyamide has a ratio of a volume average particle diameter to a number average particle diameter of the range of 2.0 to 5.0, and the polyphenylene ether in the resin composition has a weight average molecular weight of the range of 45,000 to 65,000.

18 Claims, 2 Drawing Sheets

RESIN COMPOSITION EXCELLENT IN STABILITY TO FACE IMPACT

This application is based on and hereby claims priority to PCT Application No. PCT/JP2004/013653 filed on Sep. 17, 2004 and Japanese Application No. 2003-325686 filed on Sep. 18, 2003, the contents of which are hereby incorporated by reference.

TECHNICAL FIELD

The present invention relates to a resin composition. More particularly, the present invention relates to a resin composition which is small in dispersion of multi axial impact strength at low temperatures, highly inhibited from reduction of tensile elongation and discoloration of molded articles after heat treatment, and excellent in impact strength after retention at melting temperatures.

BACKGROUND ART

Polyamide-polyphenylene ether based materials are employed for various uses, particularly, uses for vehicles, such as body panels, fuel flappers, door mirror shells, wheel caps, blower fans for air conditioners, and relay blocks because of their excellent mechanical characteristics, heat resistance, oil resistance, etc. These component parts are required to maintain stable characteristics over a wide temperature range. Therefore, they are required to have excellent mechanical characteristics and discoloration resistance after hot aging and high impact strength at low temperatures.

As for the technologies for increasing mechanical strength after hot aging, for example, Patent Document 1 and Patent Document 2 disclose addition of a copper compound. However, these technologies can improve mechanical characteristics and the like after hot aging, but suffer from the problems that the molded pieces after hot aging seriously discolor to result in restrictions in uses and colors.

Furthermore, as for the technologies for improving discoloration resistance, for example, Patent Documents 3-5 disclose addition of titanium dioxide. However, these technologies are mainly for inhibition of light discoloration of polyamide-polyphenylene ether based materials and are not so effective for inhibition of discoloration caused by exposure to high temperatures as mentioned above. Some effects are recognized in the case of adding titanium dioxide in a large amount, but in this case mechanical characteristics are deteriorated, which does not meet the requirement of high mechanical strength after hot aging demanded by the market.

As a technology of enhancing multi axial impact strength of polyamide-polyphenylene ether based materials, for example, Patent Document 6 discloses to melt kneading a block copolymer having a specific viscosity at a specific temperature to form a network structure of the block copolymer. Furthermore, Patent Document 7 discloses a technology in which polyphenylene ether particles are dispersed so that more than half of the dispersed particles have a dispersion diameter of 1.0 µm or less, and, furthermore, concentration of terminal groups of polyamide and polyphenylene ether is limited to a specific range. However, it has recently been found that the above technology is insufficient for improving the practical multi axial impact strength. That is, the resin composition obtained by the above technology is improved in multi axial impact strength of its molded articles in the form of flat plate, but is not sufficiently improved for practically usable molded articles having a three-dimensional shape. For example, the molded articles used for vehicles, such as body panels, fuel flappers, door mirror shells, wheel caps and blower fans for air-conditioners, all have a curved surface. That is, the performance demanded for polyamide-polyphenylene ether based materials by the market is high multi axial impact strength of the curved surface portions at low temperatures.

Usually, polyamide-polyphenylene ether based materials have a relatively high standard deviation in measurement of multi axial impact strength of flat plate molded pieces at low temperatures (namely, having a relatively great variation in multi axial impact strength at low temperatures). Even in the case of a composition having a sufficient multi axial impact strength in its flat plate molded pieces, there is a problem that variation is apt to be caused in multi axial impact strength of curved surface portions of the molded pieces at low temperatures as compared with multi axial impact strength of flat plate molded pieces, resulting in decrease of the average value. That is, it is clear that in order to improve the multi axial impact strength of curved surface portions of the molded pieces, there are needed resin compositions capable of providing flat plate molded pieces having a more stable multi axial impact strength at low temperatures with no variation.

Moreover, there is a problem that since large molding machines of the several thousand-ton class in mold clamping pressure are used for making large molded articles such as body panels, fuel flappers and door mirror shells of automobiles, residence time of the resin in the cylinder of the molding machines increases, resulting in sharp reduction of mechanical characteristics (particularly, impact resistance). For attaining the stability after retention of resin in these molding machines, the above-mentioned technologies are insufficient and improvement in this respect has been demanded.

Patent Document 1: U.S. Pat. No. 4,857,575
Patent Document 2: JP-A-6-157894
Patent Document 3: JP-A-5-306368
Patent Document 4: JP-A-5-295250
Patent Document 5: JP-A-6-287446
Patent Document 6: JP-A-63-92668
Patent Document 7: JP-A-2002-338805

DISCLOSURE OF INVENTION

Problem to be solved by the Invention

One of the objects of the present invention is to provide a resin composition which is not only excellent in multi axial impact strength at low temperatures, but also less in variation of the values of multi axial impact strength, excellent in multi axial impact strength of molded articles having curved surface made from the composition, highly inhibited from reduction of tensile elongation and discoloration of molded articles after heat treatment, and excellent in impact strength after retention at melting temperatures. Another object of the present invention is to provide a molded article comprising the above resin composition.

Means for Solving the Problem

As a result of intensive research conducted by the inventors in an attempt to solve the above problems, it has been found that the above object can be attained by a polyamide-polyphenylene ether resin composition containing copper and titanium dioxide and/or carbon black in which the dispersion state of a dispersed phase (namely, a ratio of a volume average particle diameter and a number average particle diameter of the dispersed phase) is controlled to a specific range and the weight average molecular weight of the polyphenylene ether in the composition is controlled to a specific range. Thus, the present invention has been accomplished.

That is, the embodiments of the present invention are as follows.

(1) A resin composition containing (a) a polyamide; (b) a polyphenylene ether; (c) at least one partially hydrogenated block copolymer; (d) copper; and (e) titanium dioxide and/or carbon black, wherein the polyphenylene ether (b) in the composition has a weight average molecular weight of 45,000-65,000, the partially hydrogenated block copolymer (c) is a partially hydrogenated product of an ABA type and/or an ABAB type block copolymer comprising an aromatic vinyl compound block (A) and a conjugated diene compound block (B), the copper (d) is contained in an amount of 1-20 mass ppm based on the total mass of the resin composition, the titanium dioxide and/or carbon black (e) is contained in an amount of 0.1-2 mass % based on the total mass of the resin composition, the polyamide (a) forms a continuous phase, the polyphenylene ether (b) is dispersed in the continuous phase to form a dispersed phase, the partially hydrogenated block copolymer (c) is present in at least one phase selected from the continuous phase of the polyamide (a) and the dispersed phase of the polyphenylene ether (b), whereby when the partially hydrogenated block copolymer (c) is present in the dispersed phase of the polyphenylene ether (b), the partially hydrogenated block copolymer (c) forms a dispersed phase together with the polyphenylene ether (b) and when the partially hydrogenated block copolymer (c) is present in the continuous phase of the polyamide (a), the partially hydrogenated block copolymer (c) singly forms a dispersed phase different from the dispersed phase of the polyphenylene ether (b), and the dispersed phase containing the polyphenylene ether (b) and/or the partially hydrogenated block copolymer (c) dispersed in the polyamide (a) has a ratio (Dv/Dn) of a volume average particle diameter (Dv) and a number average particle diameter (Dn) in the range of 2.0-5.0.

(2) A resin composition described in the above (1) which contains the copper (d) in an amount of 1-10 mass ppm based on the total mass of the resin composition.

(3) A resin composition described in the above (1), wherein the copper (d) is represented by the formula:

$Cu_aX_bY_c$ (in the above formula, Cu represents copper, X represents a group selected from OH, $CH_3COO$, $SO_4$ and CN, Y represents oxygen or a halogen, and a, b and c represent an integer of 0-7, with a proviso that a cannot be 0).

(4) A resin composition described in the above (1), wherein Dv/Dn is in the range of 2.5-5.0.

(5) A resin composition described in the above (1), wherein the polyphenylene ether (b) in the resin composition has a weight average molecular weight of 45,000-58,000.

(6) A resin composition described in the above (1) which contains as the polyphenylene ether (b) a mixture of two or more polyphenylene ethers different in weight average molecular weight.

(7) A resin composition described in the above (1) which contains as the polyphenylene ether (b) a mixture of a functionalized polyphenylene ether and an unfunctionalized polyphenylene ether.

(8) A resin composition described in the above (1), wherein the polyamide (a) is polyamide 6,6.

(9) A resin composition described in the above (1) which contains a polyamide previously containing the copper (d) as the polyamide (a).

(10) A resin composition described in the above (9) which contains as the polyamide (a) at least two polyamide components of a polyamide containing the copper (d) in an amount of not less than 10 ppm and not more than 150 ppm and a polyamide containing the copper (d) in an amount of not less than 0 ppm and less than 10 ppm.

(11) A resin composition described in the above (1) which contains at least one partially hydrogenated block copolymer having a number average molecular weight of 200,000-300,000 as the partially hydrogenated block copolymer (c).

(12) A resin composition described in the above (1) which contains a polyphenylene ether copolymer (b-1) of 2,6-dimethylphenol and 2,3,6-trimethylphenol as the polyphenylene ether (b), each monomer unit of the polyphenylene ether copolymer (b-1) comprising 80-90 mass % of 2,6-dimethylphenol and 10-20 mass % of 2,3,6-trimethylphenol based on the total mass of the polyphenylene ether copolymer (b-1).

(13) A resin composition described in the above (1), wherein the titanium dioxide and/or carbon black (e) are previously mixed with at least a part of the polyamide (a), and then mixed with the polyphenylene ether (b) and the partially hydrogenated block copolymer (c).

(14) A resin composition described in the above (1), wherein carbon black having a DBP absorption (measured in accordance with ASTM D2414) of not more than 100 cc/100 g is used as the component (e).

(15) A resin composition described in the above (1) which additionally contains (f) iron in an amount of not more than 300 mass ppm based on the total mass of the resin composition.

(16) A resin composition described in the above (15), wherein the iron (f) is represented by the formula:

$Fe_aX_bY_c$ (in the above formula, Fe represents iron, X represents a group selected from OH, $CH_3COO$, $SO_4$ and CN, Y represents oxygen or a halogen, and a, b and c represent an integer of 0-7, with a proviso that a cannot be 0).

(17) A molded article comprising the resin composition described in the above (1).

(18) A molded article described in the above (17) which has a curved surface having a radius of 200-400 mm on the outer surface.

(19) A molded article described in the above (17) which is a part of vehicles.

(20) A molded article described in the above (17) which is an exterior material for vehicles.

The above and other objects, characteristics and advantages of the present invention will be clear for one skilled in the art from the following detailed descriptions and claims.

The present invention will be explained in detail below.

The present invention provides a resin composition containing (a) a polyamide; (b) a polyphenylene ether; (c) at least one partially hydrogenated block copolymer; (d) copper; and (e) titanium dioxide and/or carbon black, wherein the polyphenylene ether (b) in the composition has a weight average molecular weight of 45,000-65,000, the partially hydrogenated block copolymer (c) is a partially hydrogenated product of an ABA type and/or an ABAB type block copolymer comprising an aromatic vinyl compound block (A) and a conjugated diene compound block (B), the copper (d) is contained in an amount of 1-20 mass ppm based on the total mass of the resin composition, the titanium dioxide and/or carbon black (e) are contained in an amount of 0.1-2 mass % based on the total mass of the resin composition, the polyamide (a) forms a continuous phase, the polyphenylene ether (b) is dispersed in the continuous phase to form a dispersed phase, the partially hydrogenated block copolymer (c) is present in at least one phase selected from the continuous phase of the polyamide (a) and the dispersed phase of the polyphenylene ether (b), and the dispersed phase containing the polyphenylene ether (b) or both the polyphenylene ether (b) and the partially hydrogenated block copolymer (c) dispersed in the polyamide (a) has a ratio (Dv/Dn) of a volume average particle diameter (Dv) and a number average particle diameter (Dn) in the range of 2.0-5.0.

As the polyamide (a) which can be used in the resin composition of the present invention, there may be used any of those which have an amide linkage {—NH—C(=O)—} in the repeating structure of polymer. Generally, polyamides are obtained by ring opening polymerization of lactams, polycondensation of diamines and dicarboxylic acids, polycondensation of aminocarboxylic acids, and the like, and the present invention is not limited to use of these polyamides.

The above diamines are classified roughly into aliphatic, alicyclic and aromatic diamines. Examples of the diamines are tetramethylenediamine, hexamethylenediamine, undecamethylenediamine, dodecamethylenediamine, tridecamethylenediamine, 2,2,4-trimethylhexamethylenediamine, 2,4,4-trimethylhexamethylenediamine, 5-methylnonamethylenediamine, 1,3-bisaminomethylcyclohexane, 1,4-bisaminomethylcyclohexane, m-phenylenediamine, p-phenylenediamine, m-xylylenediamine, p-xylylenediamine, etc.

The dicarboxylic acids are classified roughly into aliphatic, alicyclic and aromatic dicarboxylic acids. Examples of the dicarboxylic acids are adipic acid, suberic acid, azelaic acid, sebacic acid, dodecanoic diacid, 1,1,3-tridecanoic diacid, 1,3-cyclohexanedicarboxylic acid, terephthalic acid, isophthalic acid, naphthalenedicarboxylic acid, dimer acid, etc.

Examples of the lactams are ε-caprolactam, enantholactam, ω-laurolactam, etc.

Examples of the aminocarboxylic acids are ε-aminocaproic acid, 7-aminoheptanoic acid, 8-aminooctanoic acid, 9-aminononanoic acid, 11-aminoundecanoic acid, 12-aminododecanoic acid, 13-aminotridecanoic acid, etc.

In the present invention, there may be used any of copolymeric polyamides obtained by polycondensation of these lactams, diamines, dicarboxylic acids, and ω-aminocarboxylic acids alone or in admixture of two or more.

Furthermore, there may also be suitably used those which are obtained by polymerizing these lactams, diamines, dicarboxylic acids, and ω-aminocarboxylic acids to oligomers of low molecular weight in a polymerization reactor and then increasing the molecular weight by an extruder or the like.

The polyamides particularly effectively usable in the present invention include, for example, polyamide 6, polyamide 6,6, polyamide 4,6, polyamide 11, polyamide 12, polyamide 6,10, polyamide 6,12, polyamide 6/6,6, polyamide 6/6,12, polyamide MXD (m-xylylenediamine)/6, polyamide 6,T, polyamide 6,I, polyamide 6/6,T, polyamide 6/6,I, polyamide 6,6/6,T, polyamide 6,6/6,I, polyamide 6/6,T/6,I, polyamide 6,6/6,T/6,I, polyamide 6/12/6,T, polyamide 6,6/12/6,T, polyamide 6/12/6,I, polyamide 6,6/12/6,I, etc. The polyamides obtained by copolymerizing a plurality of polyamides by an extruder or the like may also be used. Preferable polyamides are polyamide 6, polyamide 6,6, polyamide 6/6,6 and mixtures thereof, and most preferred is polyamide 6,6.

The number average molecular weight of the polyamides used in the present invention is preferably 5,000-100,000, more preferably 10,000-30,000.

The molecular weight of the polyamides in the present invention is not limited to those mentioned above, and the polyamide may be a mixture of a plurality of the polyamides differing in molecular weight. For example, mention may be made of mixtures of a low molecular weight polyamide having a number average molecular weight of 10,000 or less and a high molecular weight polyamide having a number average molecular weight of 30,000 or more, mixtures of a low molecular weight polyamide having a number average molecular weight of 10,000 or less and a general polyamide having a number average molecular weight of about 15,000, etc.

Terminal groups of the polyamides participate in the reaction with polyphenylene ether. Polyamides generally have amino group and carboxyl group as terminal groups, and increase of concentration of the carboxyl group results in decrease of impact resistance and increase of fluidity. On the other hand, increase of concentration of the amino group results in increase of impact resistance and decrease of fluidity.

The ratio of concentration of amino group/carboxyl group in polyamide terminal groups in the present invention is preferably 9/1-1/9, more preferably 8/2-1/9, further preferably 6/4-1/9. The concentration of the terminal amino group is preferably at least 10 milli-equivalent/kg, more preferably 30 milli-equivalent/kg or higher.

The adjustment of these terminal groups of the polyamides can be carried out by using known methods. Specifically, mention may be made of a method of adding diamines, dicarboxylic acids, monocarboxylic acids and the like at the time of polymerization of the polyamide so as to give a desired terminal group concentration.

In the present invention, it is effective to use two or more polyamides. Specifically, the multi axial impact strength at low temperatures can be further increased by using a mixture of at least two polyamides differing in molecular weight and/or concentration of terminal functional group. Furthermore, known additives which can be added to polyamides may also be added in an amount of less than 10 mass parts based on 100 mass parts of the polyamide.

The polyphenylene ether (b) usable in the present invention is a homopolymer and/or a copolymer comprising a structural unit represented by the following formula.

[Formula 1]

[$R_1$-$R_4$ independently of one another represent hydrogen, halogen, primary or secondary lower alkyl, phenyl, haloalkyl, aminoalkyl, hydrocarbonoxy or halohydrocarbonoxy (with a proviso that a halogen atom and an oxygen atom are separated by at least two carbon atoms)].

Examples of the polyphenylene ether in the present invention are poly(2,6-dimethyl-1,4-phenylene ether), poly(2-methyl-6-ethyl-1,4-phenylene ether), poly(2-methyl-6-phenyl-1,4-phenylene ether), poly(2,6-dichloro-1,4-phenylene ether), etc. Further examples are polyphenylene ether copolymers such as copolymers of 2,6-dimethylphenol with other phenols (e.g., 2,3,6-trimethylphenol and 2-methyl-6-butylphenol). Among them, preferred are poly(2,6-dimethyl-1, 4-phenylene ether) and copolymers of 2,6-dimethylphenol with 2,3,6-trimethylphenol, and more preferred is poly(2,6-dimethyl-1,4-phenylene ether).

When a copolymer of 2,6-dimethylphenol and 2,3,6-trimethylphenol is used as the polyphenylene ether (b-1), each monomer unit comprises especially preferably about 80-about 90 mass % of 2,6-dimethylphenol and about 10-about 20 mass % of 2,3,6-trimethylphenol based on the total mass of the polyphenylene ether copolymer (b-1).

The method for producing the polyphenylene ether used in the present invention is not particularly limited so long as it is a known method. For example, it can be easily produced by oxidative polymerization of 2,6-dimethylphenol using a complex of cuprous chloride and amine as a catalyst as disclosed in U.S. Pat. No. 3,306,874. In addition, it can be easily produced by the methods disclosed in U.S. Pat. Nos. 3,306,875, 3,257,357, 3,257,358, JP-B-52-17880, JP-A-50-51197, JP-A-63-152628, etc.

The weight average molecular weight of the polyphenylene ether usable in the present invention is preferably 4,000-100,000, more preferably 12,000-65,000, further preferably 30,000-60,000.

In the present invention, it is preferred to use a blend of two or more polyphenylene ethers differing in weight average molecular weight because the change in physical properties caused by variation of processing conditions can be inhibited. For example, mention may be made of mixtures of a polyphenylene ether having a weight average molecular weight of less than 50,000 and a polyphenylene ether having a weight average molecular weight of 50,000 or more, mixtures of a low molecular weight polyphenylene ether having a weight average molecular weight of 45,000 or less and a polyphenylene ether having a weight average molecular weight of 50,000 or more, etc.

Moreover, the polyphenylene ether which can be used in the present invention may contain both the previously functionalized polyphenylene ether and the unfunctionalized polyphenylene ether.

Furthermore, in the case of using two or more polyphenylene ethers different in reduced viscosity, preferably at least one of them is a previously functionted polyphenylene ether. More preferably, all of the polyphenylene ethers used are previously functionalized polyphenylene ethers.

The previously functionalized polyphenylene ether here means a polyphenylene ether functionalized with at least one functionalizing compound which has at least one carbon-carbon double bond or triple bond and has at least one carboxylic acid group, acid anhydride group, amino group, hydroxyl group or glycidyl group in the molecular structure (hereinafter referred to as "functionalized polyphenylene ether").

As methods for producing the functionalized polyphenylene ether, mention may be made of (1) a method of reacting with a functionalizing compound in the presence or absence of a radical initiator at a temperature of not lower than 100° C. and lower than the glass transition temperature of the polyphenylene ether without melting the polyphenylene ether, (2) a method of melt kneading and reacting with a functionalizing compound in the presence or absence of a radical initiator at a temperature of not lower than the glass transition temperature of the polyphenylene ether and not higher than 360° C., (3) a method of reacting a polyphenylene ether with a functionalizing compound in a solution in the presence or absence of a radical initiator at a temperature of lower than the glass transition temperature of the polyphenylene ether, and the like. Any of these methods can be used, but the method of (1) or (2) is preferred.

Next, at least one functionalizing compound which has at least one carbon-carbon double bond or triple bond and has at least one carboxylic acid group, acid anhydride group, amino group, hydroxyl group or glycidyl group in the molecular structure will be specifically explained.

The functionalizing compounds having simultaneously the carbon-carbon double bond and the carboxylic acid group or acid anhydride group in the molecule include, for example, maleic acid, fumaric acid, chloromaleic acid, cis-4-cyclohexene-1,2-dicarboxylic acid and acid anhydrides thereof. Fumaric acid, maleic acid and maleic anhydride are preferred, and fumaric acid and maleic anhydride are especially preferred. Furthermore, there may be used these unsaturated dicarboxylic acids in which one or two of carboxyl groups are esterified and those in which the ester is decomposed and converted to carboxyl groups at processing temperatures.

The functionalizing compounds having simultaneously the carbon-carbon double bond and glycidyl group in the molecule include, for example, allylglycidyl ether, glycidyl acrylate, glycidyl methacrylate, epoxidized natural fat and oil, and the like. Among them, especially preferred are glycidyl acrylate and glycidyl methacrylate.

The functionalizing compounds having simultaneously the carbon-carbon double bond and hydroxyl group in the molecule include, for example, unsaturated alcohols of the formula $C_nH_{2n-3}OH$ (n is a positive integer) and unsaturated alcohols of the formulas $C_nH_{2n-5}OH$, $C_nH_{2n-7}OH$ (n is a positive integer), such as allyl alcohol, 4-pentene-1,4-ol and 1,4-pentadiene-3-ol.

Of these functionalizing compounds, maleic anhydride is most preferred. The functionalizing compounds mentioned above may be used each alone or in combination of two or more.

The amount of the functionalizing compound used for producing the functionalized polyphenylene ether is preferably 0.1-10 mass parts, more preferably 0.3-5 mass parts based on 100 mass parts of the polyphenylene ether. The amount of the radical initiator used for producing the functionalized polyphenylene ether using a radical initiator is preferably 0.001-1 mass part based on 100 mass parts of the polyphenylene ether.

Unreacted functionalizing compound and/or polymer of the functionalizing compound may remain in the functionalized polyphenylene ether. The amount of the unreacted functionalizing compound and/or the polymer of the functionalizing compound remaining in the functionalized polyphenylene ether is preferably less than 1 mass %, especially preferably less than 0.5 mass % based on the total mass of the functionalized polyphenylene ether including the unreacted functionalizing compound and/or the polymer of the functionalizing compound.

The addition rate of the functionalizing compound in the functionalized polyphenylene ether usable in the present invention is preferably about 0.15 to about 0.7 mass %, more preferably about 0.35 to about 0.6 mass %, most preferably about 0.4 to about 0.55 mass % based on the total mass of the functionalized polyphenylene ether. When the functionalizing compound is, for example, an acid, the addition rate of the functionalizing compound to the polyphenylene ether can be obtained by dissolving the polyphenylene ether component in toluene and carrying out titration with a solution of sodium methylate in methanol.

In the present invention, there is a preferred range in the molecular weight of polyphenylene ether in the composition. It is important that the molecular weight of polyphenylene ether in the composition is within the preferred range, and in this case, there can be developed the performances of excellent multi axial impact strength at low temperatures, small variation in the value of the strength, and excellent multi axial impact strength of molded articles having curved surface made from the composition which are the effects of the present invention. Specifically, it is necessary that the weight average molecular weight of the polyphenylene ether in the composition is within the range of 45,000-65,000, more preferably 45,000-58,000. Furthermore, preferred number average molecular weight in this case is 15,000-24,000.

The weight average molecular weight and the number average molecular weight of the polyphenylene ether in the present invention mean the molecular weights calculated in terms of standard polystyrene.

The weight average molecular weight and the number average molecular weight of the polyphenylene ether in the composition can be measured by the following method. Pellets or molded piece of a resin composition comprising polyamide-polyphenylene ether is sliced to a thickness of 20 µm using a microtome, and 0.2 g of the resulting leaf was introduced into 100 g of chloroform, followed by shaking at a temperature of 50° C. for at least 1 hour to extract polyphenylene ether into chloroform. Then, the resulting extraction solution was subjected to measurement using a gel permeation chromatography measurement device (GPC SYSTEM 21: manufactured by Showa Denko K.K.) by an ultraviolet spectroscopic detector (UV-41: manufactured by Showa Denko K.K.), followed by converting into number average molecular weight and weight average molecular weight using the formula for calculation in terms of standard polystyrene [solvent: chloroform, temperature: 40° C., column: sample side (K-G, K-800RL, K-800R), reference side (two columns of K-805L), flow rate: 10 ml/min, measurement wavelength: 283 nm, pressure: 12-17 kg/cm$^2$]

Hitherto, it has been disclosed in the conventional technology of polyamide-polyphenylene ether based materials that physical properties of a composition are controlled by means of the molecular weight of the polyphenylene ether as a starting material.

On the other hand, it is generally known for one skilled in the art that polyphenylene ether greatly changes in its molecular weight by melting. For example, when a polyphenylene ether starting material having a weight average molecular weight of about 50,000 is simply melt kneaded, the molecular weight increases to about 70,000. As for the number average molecular weight, when a polyphenylene ether starting material having a number average molecular weight of 22,000 is melt kneaded, the molecular weight increases to about 27,000. It is considered that this is because radicals generated at the terminals of the molecular chain of polyphenylene ether by heating are bonded to other polyphenylene ether molecules present near the terminals.

Furthermore, some of compatibilizing agents added for improving the compatibility of polyphenylene ether and polyamide have an effect to inhibit the change of molecular weight of polyphenylene ether. Specifically, maleic acid, maleic anhydride, citric acid, itaconic acid and derivatives thereof which are commercially most widely used in polyamide-polyphenylene ether alloys have the effect to inhibit the change of molecular weight.

For example, when the above-mentioned polyphenylene ether starting materials having a weight average molecular weight of about 50,000 are melt kneaded in the presence of maleic anhydride (about 2 mass %), the molecular weight increases to only about 58,000. It is presumed that this is because the compatibilizing agent traps the radicals generated at the terminals of polyphenylene ether molecular chain by heating, thereby inhibiting bonding of polyphenylene ether molecular chains to each other. Since this inhibitory effect changes also by the weight ratio of the compatibilizing agent and polyphenylene ether, it is difficult to estimate the molecular weight of the polyphenylene ether in the composition even by adjusting the molecular weight of the polyphenylene ether as a starting material.

Furthermore, the molecular weight of polyphenylene ether also greatly changes depending on the processing conditions (heating condition, kneading condition, etc.). As a result, the molecular weight of polyphenylene ether in the final composition greatly changes depending the processing conditions (difference in screw diameter and screw length of extruder, screw configuration, extrusion rate, screw rotating speed, etc.).

As mentioned above, since the molecular weight of polyphenylene ether greatly changes depending on the amount of compatibilizing agent and processing conditions, it is necessary to optimize the conditions for obtaining the composition of the present invention. A composition which is prepared under improper conditions and in which the weight average molecular weight of the polyphenylene ether (in the composition) is outside the range of 45,000 -65,000 specified in the present invention will be unable to develop sufficient effects.

Furthermore, in the present invention, a styrene-based thermoplastic resin may be added in an amount of less than 100 mass parts based on 100 mass parts of polyphenylene ether. The styrene-based thermoplastic resins in the present invention include, for example, polystyrene (including syndiotactic polystyrenes), high-impact polystyrene (HIPS), styrene-acrylonitrile copolymer (AS resin), styrene-rubber-like polymer-acrylonitrile copolymer (ABS resin), etc.

Moreover, known additives which can be added to polyphenylene ether may also be added in an amount of less than 10 mass parts based on 100 mass parts of polyphenylene ether.

Next, the partially hydrogenated block copolymers (c) used in the present invention will be explained.

The partially hydrogenated block copolymers usable in the present invention are partially hydrogenated products of ABA and/or ABAB type block copolymers comprising an aromatic vinyl compound block (A) and a conjugated diene compound block (B). The aromatic vinyl compound block (A) here means a polymer block mainly composed of an aromatic vinyl compound and the conjugated diene compound block (B) means a polymer block mainly composed of a conjugated diene compound. The term "mainly composed of" means "containing at least 50 mass %", more preferably "containing 80 mass % or more".

Examples of the aromatic vinyl compound constituting the aromatic vinyl compound block (A) are styrene, α-methylstyrene, vinyltoluene, etc. and at least one compound selected from them is used. Among them, styrene is especially preferred.

Examples of the conjugated diene compound constituting the conjugated diene compound block (B) are butadiene, isoprene, piperylene, 1,3-pentadiene, etc. and at least one compound selected from them is used. Among them, butadiene, isoprene and combination of them are preferred.

The microstructure of the conjugated diene compound block portion of the partially hydrogenated block copolymer is such that 1,2-vinyl content or the total of 1,2-vinyl content and 3,4-vinyl content is preferably 5-80%, more preferably 10-50%, and most preferably 15-40%.

The mass ratio of the aromatic vinyl compound and the conjugated diene compound in the partially hydrogenated block copolymer is preferably 10/90-90/10, more preferably 15/85-80/20, further preferably 15/85-60/40, most preferably 20/80-45/55.

Furthermore, the partially hydrogenated block copolymer may be a blend of two or more of the copolymers differing in the mass ratio of the aromatic vinyl compound and the conjugated diene compound.

The "partial hydrogenation" of the partially hydrogenated block copolymer means that a block copolymer is hydrogenated to control the aliphatic double bond in the block copolymer to a range of more than 0% and less than 100%. A preferred hydrogenation rate of the partially hydrogenated block copolymer is 50% or higher, more preferably 80% or higher, most preferably 98% or higher.

Furthermore, with reference to the molecular weight of the partially hydrogenated block copolymer in the present invention, the number average molecular weight measured by GPC device [SYSTEM 21] manufactured by Showa Denko K.K. at 40° C. using chloroform as a solvent and calculated on polystyrene standard is preferably 10,000-500,000, more preferably 200,000-300,000, most preferably 200,000-250,000.

In the present invention, it is preferred that one aromatic vinyl compound block in the partially hydrogenated block copolymer has a number average molecular weight of 20,000 or more.

The number average molecular weight of one aromatic vinyl compound block in the partially hydrogenated block copolymer here can be obtained by the following formula using the number average molecular weight of the partially hydrogenated block copolymer measured by the above-mentioned method.

$$Mn_{(a)} = \{Mn \times a/(a+b)\}/N$$

(in the above formula, $Mn_{(a)}$ represents the number average molecular weight of one aromatic vinyl compound block, Mn represents the number average molecular weight of the partially hydrogenated block copolymer, a represents a mass % of all aromatic vinyl compound blocks in the partially hydrogenated block copolymer, b represents a mass % of all conjugated diene compound blocks in the partially hydrogenated block copolymer, and N represents the number of the aromatic vinyl compound blocks in the partially hydrogenated block copolymer).

As the partially hydrogenated block copolymer, there may be used a mixture of two or more partially hydrogenated block copolymers different in bonding type, number average molecular weight, kind of aromatic vinyl compound, kind of conjugated diene compound, 1,2-vinyl content or 1,2-vinyl content and 3,4-vinyl content, content of aromatic vinyl compound component, and hydrogenation rate. Among them, preferred are mixtures of two or more partially hydrogenated block copolymers different in number average molecular weight.

In the present invention, it is necessary that copper (d) is contained in an amount of 1-20 mass ppm based on the total mass of the resin composition. The content is more preferably 2-10 mass ppm.

If the content of copper in the resin composition exceeds 20 mass ppm, there is the problem of increase in discoloration during hot aging. If it is less than 1 mass ppm, there occurs a trouble that maintenance of normal tensile strain at break is sharply deteriorated after hot aging treatment than before the aging treatment.

The analysis of content of copper in the resin composition can be carried out, for example, by determination with characteristic wavelength of copper by high frequency inductively coupled plasma (ICP) spectrometry. Specifically, 0.5 g of a sample to be evaluated is weighed on a platinum tray and carbonized at 500° C. in an electric furnace. After cooling, 5 ml of hydrochloric acid and 5 ml of pure water are added, followed by dissolution with boiling on a heater. The solution is again cooled, and pure water is added to make 500 ml in total. Then, the content can be determined with characteristic wavelength of copper by high frequency inductively coupled plasma (ICP) spectrometry using IRIS/IP manufactured by Thermo JarrellAsh.

In the present invention, the form of copper present in the resin composition may be any of metallic copper, copper ion and copper compound, but the form of copper ion or copper compound is more preferred.

The copper is preferably added as a substance having the following formula.

$$Cu_a X_b Y_c$$

(in the above formula, Cu represents copper, X represents a group selected from OH, $CH_3COO$, $SO_4$ and CN, Y represents oxygen or a halogen, and a, b and c represent an integer of 0-7, with a proviso that a cannot be 0).

As examples of copper in the present invention, mention may be made of one or more member selected from metallic copper, copper oxide, copper acetate, copper sulfate, copper iodide, copper chloride, copper bromide, etc. Preferred are one or more compounds selected from copper acetate, copper iodide and copper chloride. Most preferred is copper iodide, copper chloride or a mixture thereof.

Furthermore, it is more preferred to add copper in the form of a master batch prepared by previously allowing copper to be present in polyamide than to add copper during preparation of the polyamide-polyphenylene ether composition. By adding copper as a master batch, dispersibility of copper in the composition is highly improved.

Preferred methods for adding copper or copper compound to polyamide include, for example, a method of blending a polyamide with copper and/or copper compound and then carrying out polymerization of the polyamide, a method of adding copper and/or copper compound at either one of the stages in polymerization step of polyamide, a method of adding copper and/or copper compound by melt kneading method, a method of applying copper and/or copper compound to the surface of polyamide pellets, and the like. Of these methods, preferred are a method of adding at the time of polymerization of polyamide and a method of melting the polyamide by an extruder or the like and dispersing copper and/or copper compound therein, and most preferred is the method of adding at the time of polymerization of polyamide.

When a polyamide in which copper and/or copper compound are allowed to be present is used as the polyamide, it is preferred to use a mixture of at least two polyamides of a polyamide containing copper and/or copper compound in an amount of not less than 10 ppm and not more than 150 ppm (as a content of copper in the polyamide) and a polyamide containing copper and/or copper compound in an amount of not less than 0 ppm and less than 10 ppm (as a content of copper in the polyamide). More preferred is a mixture of a polyamide containing copper and/or copper compound in an amount of not less than 50 ppm and less than 120 ppm (as a content of copper in the polyamide) and a polyamide containing substantially no copper.

In the present invention, it is necessary that titanium dioxide and/or carbon black (e) is contained in an amount of 0.1-2 mass %, more preferably 0.2-1.0 mass % based on the total mass of the resin composition.

If the content of titanium dioxide and/or carbon black in the resin composition exceeds 2 mass %, there is the problem that normal tensile strain at break after hot aging sharply reduces than before aging treatment. If the content is less than 0.1 mass %, there is the problem that discoloration during hot aging becomes conspicuous.

In the present invention, titanium dioxide used is preferably one which has been surface treated with a surface treating agent which is an aluminasilicon compound and/or polysiloxane. The content as titanium dioxide in this case is preferably 90-99 mass %, more preferably 93-98 mass % based on the total amount of the surface treating agent and titanium dioxide. The amount of the surface treating agent is not included in the content of titanium dioxide in the resin composition of the present invention.

Furthermore, the titanium dioxide particles used in the present invention are preferably as small as possible in particle diameter distribution, and it is preferred that a majority of the particles have a diameter of 0.2-0.4 μm.

The carbon black used in the present invention is preferably one which has a DBPA absorption (measured in accordance with ASTM D2414) of 100 cc/100 g or less. If carbon black having a DBPA absorption exceeding 100 cc/100 g is used, there is the possibility of deterioration in fluidity of the composition during hot aging.

In the present invention, it is preferred that titanium dioxide and/or carbon black are previously premixed with polyamide and then mixed with polyphenylene ether and partially hydrogenated block copolymer.

By employing the above method, unevenness in color caused by discoloration at heat aging can be inhibited. The reason is not clear, but it is considered that this is because the dispersibility of titanium dioxide and/or carbon black in the resin composition is improved and stable coloring ability can be developed.

In the present invention, iron (f) may be added as an additional component in an amount of not more than 300 mass ppm (based on the total mass of the resin composition).

The addition of iron results in the effects that the maintenance of normal tensile strain at break before and after hot aging is highly improved and reduction of Izod impact strength after retention of the composition in the cyclinder of the molding machine can be inhibited.

In the present invention, the form of iron (f) present in the resin composition may be any of metallic iron, iron ion and iron compound, but the form of iron ion or iron compound is more preferred.

The iron is preferably added as a substance having the following formula.

$Fe_aX_bY_c$ (in the above formula, Fe represents iron, X represents a group selected from OH, CH$_3$COO, SO$_4$ and CN, Y represents oxygen or a halogen, and a, b and c represent an integer of 0-7, with a proviso that a cannot be 0).

Examples of the iron added to the resin composition of the present invention are metallic iron, iron oxide, iron sulfate, etc. Iron oxide is most preferred.

The compositional ratio of the resin components in the resin composition of the present invention is such a proportion as about 40 to about 60 mass % of polyamide (a), about 10 to about 50 mass % of polyphenylene ether (b), and about 5 to about 20 mass % of partially hydrogenated block copolymer (c). More preferred is a proportion of about 45 to about 55 mass % of polyamide, about 20 to about 45 mass % of polyphenylene ether, and about 5 to about 15 mass % of partially hydrogenated block copolymer.

In the present invention, a compatibilizing agent may be used for the purpose of improving compatibility of polyamide and polyphenylene ether. As the compatibilizing agents usable in the present invention, there may be preferably used those which are disclosed in WO 01/81473. Of these compatibilizing agents, maleic anhydride, maleic acid, citric acid, fumaric acid, etc. are preferred, and maleic anhydride, maleic acid and citric acid are especially preferred. Most preferred is maleic anhydride.

The resin composition of the present invention has such a form of dispersion that the polyamide (a) forms a continuous phase, the polyphenylene ether (b) is dispersed in the continuous phase to form a dispersed phase, and the partially hydrogenated block copolymer (c) is present in at least one phase selected from the continuous phase of the polyamide (a) and the dispersed phase of the polyphenylene ether (b). More preferred dispersion form is that the polyamide (a) forms a continuous phase, the polyphenylene ether (b) is dispersed in the continuous phase to form a dispersed phase, and the partially hydrogenated block copolymer (c) is present in the dispersed phase of the polyphenylene ether (b). That is, when the partially hydrogenated block copolymer (c) is present in the dispersed phase of the polyphenylene ether (b), the partially hydrogenated block copolymer (c) forms a dispersed phase together with the polyphenylene ether (b) and when the partially hydrogenated block copolymer (c) is present in the continuous phase of the polyamide (a), the partially hydrogenated block copolymer (c) singly forms a dispersed phase different from the dispersed phase of the polyphenylene ether (b).

The number average particle diameter (Dn) of the dispersed phase in the resin composition of the present invention is preferably 0.2-3.0 μm, more preferably 0.5-2.0 μm, and most preferably 0.7-1.5 μm. The number average particle diameter (Dn) of the dispersed phase here is the same as the number average particle diameter mentioned hereinafter and the method of measurement is also the same as the method of measurement of the latter.

The most important for the resin composition of the present invention is that the dispersed phase containing the polyphenylene ether and/or the partially hydrogenated block copolymer has a ratio (Dv/Dn) of a volume average particle diameter (Dv) and a number average particle diameter (Dn) in the range of 2.0-5.0. More preferably, Dv/Dn is in the range of 2.5-5.0.

The volume average particle diameter (Dv) and the number average particle diameter (Dn) here mean a volume average particle diameter and a number average particle diameter obtained by dissolving a polyamide-polyphenylene ether based resin composition in formic acid, subjecting the solution to measurement using a laser diffraction type particle diameter distribution measuring apparatus, and calculating the particle diameter.

Specifically, a polyamide-polyphenylene ether based resin composition is dissolved in formic acid (90% in concentration) so as to give a concentration of 0.01-0.1 g/l over a period of at least 1 hour by an ultrasonic washing machine, thereby completely dissolving the polyamide component, and the resulting dilute solution is subjected to measurement using a laser diffraction type particle diameter distribution measuring apparatus [SALAD-7000 (manufactured by Shimadzu corp.)] at a measurement absorbance of 0.01-0.2 and an average number of measurement of 128 times to obtain the volume average particle diameter and number average particle diameter of the dispersed particles. The dispersed phase of the resin composition of the present invention means the portion in which the continuous phase mainly composed of polyamide component is excluded and it contains polyphenylene ether and/or partially hydrogenated block copolymer and further contains the above components (d) and (e) and optional additional components mentioned hereinafter. However, the components (d) and (e) (and some of the optional additional components) are usually present with particle diameter smaller than the limit of detection and do not affect the measurement of Dv/Dn of the dispersed phase mentioned hereinafter.

In the measurement of the volume average particle diameter and number average particle diameter of the dispersed phase, it is necessary that the refractive index of the dispersed phase to be subjected to measurement is set at an optimum value.

The refractive index of the dispersed phase in this measurement is one which is close to the refractive index of polyphenylene ether (1.575) disclosed in the document (Polymer Handbook 3rd Edition) and is obtained by a method called JFCC method disclosed in the publicly known documents [Advanced Powder Technology, Vol. 30, No. 9, 60,2-60,9 (1993) and Advanced Powder Technology, Vol. 32, No. 11, 796-803 (1995)].

In the present invention, if necessary, there may be added additional components so long as the effects of the present invention are not damaged.

The additional components usable in the present invention include, for example, thermoplastic resins such as polyester and polyolefin, inorganic fillers (talc, kaolin, xonotlite, wollastonite, potassium titanate, carbon fibers, glass fibers, etc.), known silane coupling agents for enhancing affinity of inorganic fillers and resins, flame-retardants (halogenated resins, silicone-based flame-retardants, magnesium hydroxide, aluminum hydroxide, organic phosphate compounds, ammonium polyphosphate, red phosphorus, etc.), fluorine-based polymers having an effect to inhibit dripping, plasticizers (oil, low molecular weight polyolefins, polyethylene glycol, fatty acid esters, etc.), flame-retardation assistants such as antimony trioxide, various peroxides, zinc oxide, zinc sulfide, antioxidants, ultraviolet absorbers, light stabilizers, and the like.

These components may be added in an amount of not more than 50 mass parts in total based on 100 mass parts of polyphenylene ether and polyamide in total.

Examples of the processing machines used for obtaining the resin composition of the present invention are single-screw extruders, twin-screw extruders, rolls, kneaders, Brabender Plastograph, Banbury mixers, etc. Among them, twin-screw extruders are preferred, and twin-screw extruders with an upstream side feed opening and one or more downstream side feed openings are most preferred.

An example of the method for producing the resin composition is as follows. Using a twin-screw extruder having one feed opening on upstream side and at least one feed opening on downstream side, polyphenylene ether and/or functionalized polyphenylene ether, partially hydrogenated block copolymer, and, if necessary, compatibilizing agent, polystyrene, polyamide, etc. are fed from the upstream side feed opening. After melt kneading the components, polyamide and, if necessary, partially hydrogenated block copolymer are added from the downstream side feed opening, followed by melt kneading them to obtain the resin composition.

The screw diameter of the extruder in this case is not particularly limited, and is preferably about 20 mm or more and about 200 mm or less, more preferably about 40 mm or more and about 125 mm or less, most preferably about 50 mm or more and less than about 100 mm.

The L/D ratio (screw length/screw diameter) of the extruder is preferably about 20-about 60, more preferably about 30-about 60, most preferably about 40-about 60.

The preferred position of the downstream side feed opening of the extruder is such that when the length of cylinder is assumed to be 100 starting from the position of the upstream side feed opening of the extruder, the position of the first downstream side feed opening is in the range of about 30-about 70.

In a case where it is necessary to provide a second downstream side feed opening for reasons of production method, it is desired to provide it within the range of about 40-about 90 (positioned downstream from the first downstream side feed opening). Specifically, in the case of, for example, an extruder having an L/D of 40, the preferred position of the first downstream side feed opening is a position of L/D being about 12-about 28, and the position of the second downstream side feed opening is a position of L/D being about 16-about 36.

In the production of the resin composition of the present invention, the melt kneading temperature is not particularly limited, and usually a temperature at which a suitable resin composition can be obtained may be optionally selected from about 240° C.-about 360° C. It is preferably about 260° C.-about 320° C., and, particularly preferably, about 280° C.-about 320° C. up to the downstream side feed opening and about 260° C.-about 290° C. after the downstream side feed opening.

The resulting resin composition of the present invention can be molded into various molded parts by various known methods such as injection molding, extrusion molding and blow molding. It can be utilized preferably for making molded articles having curved surfaces of 20-40 cm in radius.

The present invention will be explained in detail by the following examples.

EXAMPLES

Materials Used:
Polyphenylene ether [poly(2,6-dimethyl-1,4-phenylene ether)] having a weight average molecular weight of about 34,000 and manufactured by Asahi Kasei Chemicals Co., Ltd. (hereinafter referred to as "PPE-1") and polyphenylene ether [poly(2,6-dimethyl-1,4-phenylene ether)] having a weight average molecular weight of about 44,600 and manufactured by Asahi Kasei Chemicals Co., Ltd. (hereinafter referred to as "PPE-2") were used as the polyphenylene ether.

A functionalized polyphenylene ether based on PPE-1 (hereinafter referred to as "PPE-3") was prepared by feeding a dry blend of 100 mass parts of PPE-1 and 2 mass parts of maleic anhydride obtained from Mitsubishi Chemical Corporation to a feed opening of a co-rotating twin-screw extruder of L/D=42 (ZSK40: manufactured by Coperion K.K.) and melt kneading them to obtain pellets. The cylinder temperature was set at 320° C., the screw rotating speed was 300 rpm, and the extrusion rate was 40 kg/h. The addition amount of maleic anhydride in the resulting functionalized polyphenylene ether (PPE-3) was 0.55 mass % and the weight average molecular weight was 41,500.

A functionalized polyphenylene ether based on PPE-2 (hereinafter referred to as "PPE-4") was prepared in the same manner as in preparation of PPE-3, except that the PPE used was changed to PPE-2, to obtain the functionalized polyphenylene ether (PPE-4). The addition amount of maleic anhydride in the resulting functionalized polyphenylene ether (PPE-4) was 0.48 mass % and the weight average molecular weight was 57,800.

The addition amount of maleic anhydride was measured by the following method.

Five grams of the resulting pellets were dissolved in 100 ml of toluene, the solution was dropped to 400 ml of acetone to carry out re-precipitation, followed by vacuum drying for 1 hour using a vacuum dryer set at 140° C. to obtain powdery functionalized polyphenylene ether. One gram of the resulting powdery functionalized polyphenylene ether was dissolved in 100 ml of toluene, a solution of phenolphthalein in ethanol as an indicator was added to the solution, and back titration was carried out with a 0.01 N solution of sodium methylate in methanol to measure the addition amount of maleic anhydride from the point of neutralization. In this case, in order to distinguish subtle change of color, the titration operation was automatically performed using AT-510 automatic titrating apparatus (manufactured by Kyoto Electronics Manufacturing Co., Ltd.

The molecular weight of polyphenylene ether was measured using a gel permeation chromatography measurement device (GPC SYSTEM 21: manufactured by Showa Denko K.K.) by an ultraviolet spectroscopic detector (UV-41: manufactured by Showa Denko K.K.), followed by converting to weight average molecular weight using the formula for calculation in terms of standard polystyrene [solvent: chloroform (flow rate 10 ml/min, pressure 15 kg/cm$^2$), temperature: 40° C., column: sample side (K-G, K-800RL, K-800R), reference side (two columns of K-805L), measurement wavelength: 283 nm].

Polystyrene 685 obtained from PS Japan Corporation was used as the polystyrene.

ABA type block copolymer having a bonding type of polystyrene-poly(ethylenebutylene)-polystyrene, a content of the aromatic vinyl compound of 33 mass %, a number average molecular weight of about 250,000, and a hydrogenation rate of 98% was used as the partially hydrogenated block copolymer (hereinafter referred to as "SEBS").

As the polyamide, were used two kinds of a polyamide 6,6 (hereinafter referred to as "PA66L") which had a number average molecular weight of 14,500, a terminal amino group concentration of about 30 milli-equivalent/kg and a terminal carboxyl group concentration of about 80 milli-equivalent/kg, and a copper-containing polyamide 6,6 (hereinafter referred to as "PA66") which had a number average molecular weight of about 16,000, a terminal amino group concentration of about 50 milli-equivalent/kg and a terminal carboxyl group concentration of about 80 milli-equivalent/kg, and which was polymerized in the coexistence of copper iodide and potassium iodide and contained about 100 mass ppm of copper (determined by ICP spectrometry).

Copper iodide (hereinafter referred to as "CuI") commercially available from Wako Pure Chemical Industries, Ltd. as a reagent was used as copper. In all of the following examples, copper iodide was added to the resin composition as a master batch comprising polyamide in which copper iodide was previously contained. Two kinds of master batches were prepared as the polyamide master batch in which copper iodide was previously contained in the polyamide. One was the above-mentioned PA66 and another was a master batch obtained by the following method. That is, 100 mass parts of PA66L and 3 mass parts of copper iodide were dryblended and the dry blend was melt kneaded by a co-rotating twin-screw extruder of 25 mm in screw diameter having a cylinder temperature set at 270° C. at a screw rotating speed of 300 rpm to obtain master batch pellets containing copper iodide at a high concentration. In order to know the change of copper content caused by scattering or the like during processing, the copper content in the resulting pellets was measured by ICP spectrometry to obtain about 1 mass % which was nearly the same as in the dry blend charged.

Rutile type titanium dioxide "TiONA RCL-4" obtained from Millennium Chemicals Inc. (USA) was used as the titanium dioxide. This was subjected to ignition heating under the conditions of 750° C. for 3 hours to obtain the amount of titanium dioxide contained therein, which was about 97 mass %. Furthermore, the moisture content obtained by heating at 105° C. was about 0.25 mass %.

Raven 2000 obtained from Columbian Chemicals Company was used as carbon black. This carbon black had an average particle diameter of 18 nm measured in accordance with ASTM-D3849, an NSA surface area of 194 m$^2$/g measured in accordance with ASTM-D4829, and a DBPA absorption of 65 cm$^3$/100 g measured in accordance with ASTM-D2414.

Iron oxide ($Fe_2O_3$) obtained from Walsh & Association was used as iron.

Octadecyl-3-(3,5-di-tert-butyl-4-hydroxyphenyl) propionate was used as an organic stabilizer. This stabilizer is available, for example, from Ciba Specialty Chemicals Inc.

The various operations and measurements were conducted by the following methods.

[Injection Molding]

Multipurpose Test Pieces (Normal Molding)

A multipurpose test piece was obtained using a type-A mold specified in ISO294-1 by IS80EPN injection molding machine (manufactured by Toshiba Machine Co., Ltd.) at a molten resin temperature of 290° C. and a mold temperature of 90° C. under the molding conditions specified in ISO15103-2.

Multipurpose Test Pieces (Residence Molding)

A multipurpose test piece retained in a high temperature environment was obtained under the same molding conditions as in the normal molding, except that the molten resin temperature was 310° C., only the cooling time in the molding cycle was intentionally changed to 10 minutes (about 20-about 30 seconds in the normal molding), and the resin was retained in molten state in the cylinder of the molding machine.

Flat Plate Test Pieces

A flat plate molded piece of 90 mm in length, 50 mm in width and 2.5 mm in thickness was molded at a cylinder temperature set at 290° C. and a mold temperature set at 90° C. using IS80EPN injection molding machine.

Test Pieces Having Curved Surface

Figure 2:
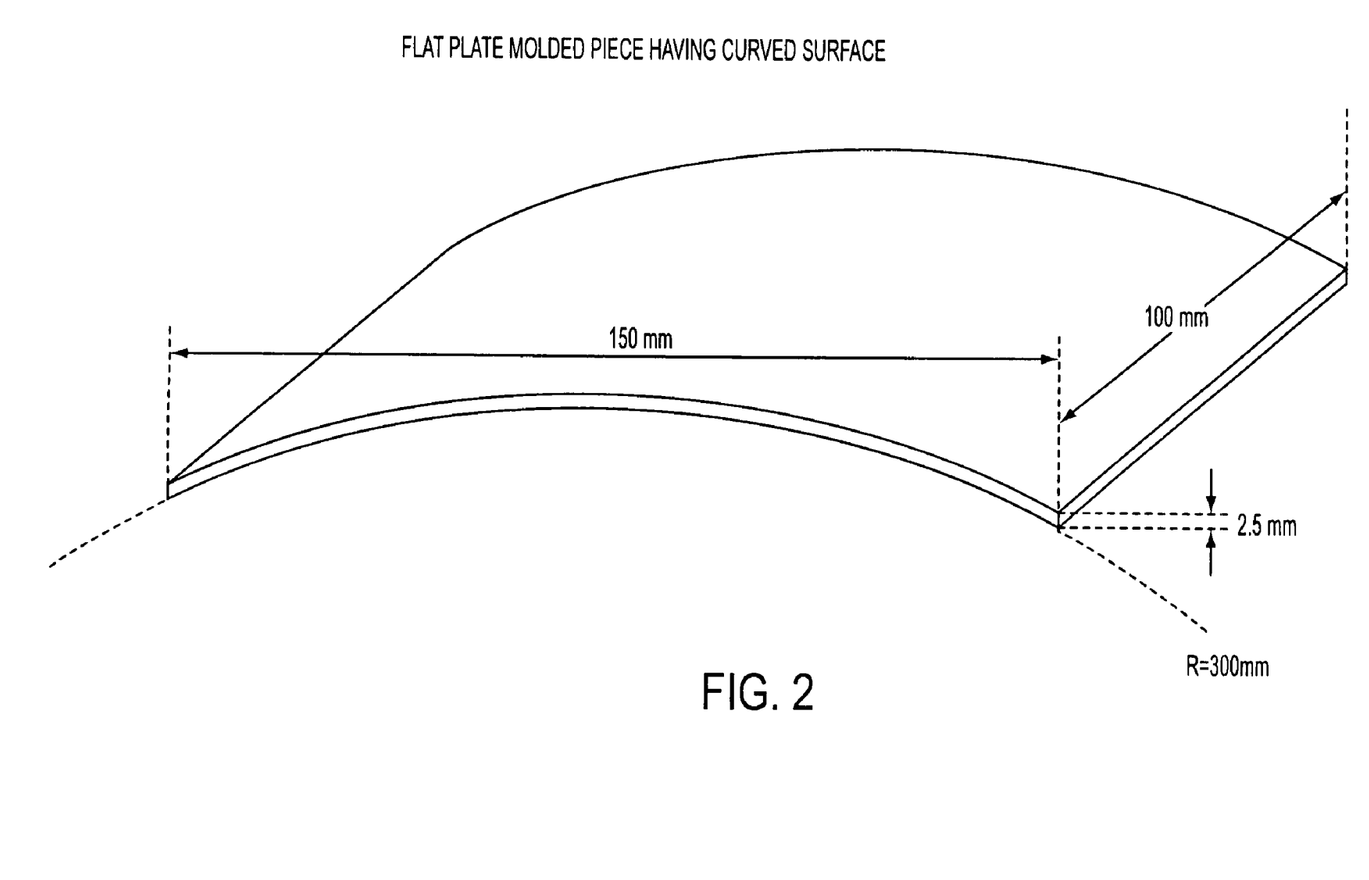
FIG. 2 shows a flat plate molded piece having curved surface and made by injection molding, in which R indicates radius of the curved surface.

A flat plate molded piece (2.5 mm in thickness, 100 mm in width and 150 mm in length and having a curved surface of 300 mm in radius in lengthwise direction) as shown in FIG. 2 was molded using SG260M-S injection molding machine (manufactured by Sumitomo Heavy Industries Ltd.). In this case, the cylinder temperature of the injection molding machine was 290° C. and the mold temperature was 90° C. The molding cycle was 45 seconds.

These various test pieces were put in aluminum moisture-proof bags just after molding, which were heat sealed and left to stand in an environment of 23° C. for about 48 hours to carry out sample conditioning.

[Content of Copper]

The copper content in PA66 and CuI-master batch used as starting materials was calculated depending on the blending ratio and the concentration was calculated.

[Ratio (Dv/Dn) of Volume Average Particle Diameter (Dv) and Number Average Particle Diameter (Dn) of the Dispersed Phase]

The resulting pellets were introduced into formic acid (90% in concentration) to give a concentration of 0.01-0.1 g/l, and the polyamide component was completely dissolved over a period of about 2 hours using an ultrasonic washing machine. The resulting dilute solution was subjected to measurement using a laser diffraction type particle diameter distribution measuring apparatus [SALAD-7000 (manufactured by Shimadzu corp.)] at a measurement absorbance range of 0.01-0.2 and at an average number of measurement of 128 times to measure the volume average particle diameter (Dv) and the number average particle diameter (Dn) of the dispersed particles, and the average particle diameter ratio (Dv/Dn) was obtained. In this case, the refractive index of the dispersed phase to be measured was measured by JFCC method and set at 1.55-1.60.

[Weight Average Molecular Weight of Polyphenylene Ether in the Resin Composition]

A part of the multipurpose test piece was sliced to a thickness of 20 μm using a microtome, and 0.2 g of the resulting leaf was introduced into 100 g of chloroform, followed by shaking at a temperature of 50° C. for 70 minutes to extract polyphenylene ether into chloroform. Then, the resulting extraction solution was subjected to measurement of weight average molecular weight by a gel permeation chromatography measurement device in the same manner as in measurement of the weight average molecular weight of the polyphenylene ether of the starting material.

[Changing Rate of Normal Tensile Strain at Break]

Changing rate of normal tensile strain at break was calculated from the values of normal tensile strains at break of the resin composition before and after heat treatment using the following formula.

$$TE_{change} = [(TE_{after} - TE_{before}) \times 100] / TE_{before}$$

[in the above formula, $TE_{change}$ represents the changing rate of normal tensile strain at break (unit: %), $TE_{after}$ represents the normal tensile strain at break after heat treatment (unit: %), and $TE_{before}$ represents the normal tensile strain at break before heat treatment (unit: %)].

The normal tensile strain at break was measured by a method in accordance with ISO527-1, except that the multipurpose test pieces subjected to heat treatment and sample conditioning mentioned hereinafter were used and the test rate was 5 mm/min.

The heating test was conducted by carrying out a heat treatment in accordance with ISO188 using a cabinet oven at an air replacing rate of 8-10 times/hour in an environment of a temperature of 100° C.±2° C. for 250 hours. The multipurpose test piece immediately after heat treatment was put in an aluminum moistureproof bag, which was heat sealed and left to stand in an environment of 23° C. for about 48 hours to carry out sample conditioning.

[Degree of Discoloration of Molded Piece After Heating]

A flat plate test piece was heat treated under the same heating conditions as in the measurement of changing rate of the normal tensile strain at break changing rate, and the color of the molded piece before and after the heat treatment was visually observed and the degree of discoloration was judged by the following evaluation criteria.

The color of the test piece before heating was light gray.

AAA: Substantially no discoloration was seen before and after the heating.

AA: The test piece after the heating somewhat discolored to yellow as compared with the test piece before the heating.

A: The test piece after the heating clearly discolored to yellow as compared with the test piece before the heating.

B: The test piece discolored to brown after the heating.

[Changing Rate of Izod Impact Strength during Retention in Molding Machine]

Izod impact strength of multipurpose test pieces prepared by normal molding and multipurpose test pieces prepared by residence molding was measured in accordance ISO180.

The changing rate of Izod impact strength during retention in the molding machine was calculated using the values of impact strength obtained above by the following formula.

$$IZOD_{change} = [(IZOD_{after} - IZOD_{normal}) \times 100] / IZOD_{normal}$$

[in the above formula, $IZOD_{change}$ represents the changing rate of Izod impact strength during retention in the molding machine (unit: %), $IZOD_{after}$ represents the Izod impact strength of the test piece prepared by residence molding (unit: kJ/m2), and $IZOD_{normal}$ represents the Izod impact strength of the test piece prepared by normal molding (unit: kJ/m2)].

[Multi Axial Impact Strength at Low Temperatures (Flat Plate)]

A flat plate molded piece of 90 mm in length, 50 mm in width, 2.5 mm in thickness was placed in a low temperature thermostatic chamber set at −30° C. for 2 hours and sufficiently cooled. Then, the molded piece was taken out and the multi axial impact strength was immediately measured using a graphic impact tester (manufactured by Toyo Seiki Seisakusho, Ltd.) having a sample holder diameter of 40 mm and a striker diameter of 12.7 mm and set at the conditions of 60 kg in loading and 5 m/sec in impacting speed of striker against the sample. The multi axial impact strength in the present invention is represented by the sum (total absorption energy) of the energy when cracking occurs in the flat plate (cracking energy) and the energy when the cracks propagate (propagation energy).

In this case, measurement was conducted on 10 pieces, respectively, and average value and standard deviation were calculated from the respective measured values. Furthermore, the resulting standard deviation was divided by the average value, and the resulting value was employed as a measure for variation from the average value.

[Multi Axial Impact Strength at Low Temperatures (Curved Surface)]

A small flat plate of 90 mm×90 mm was cut out from a test piece having a curved surface (a molded piece of 2.5 mm in thickness, 100 mm in width, 250 mm in length having a curved surface of 300 mm in radius in the lengthwise direction) by a precision cutting saw. In this case, the small flat plate was cut out from the central part of the molded piece. The multi axial impact strength at low temperatures of the thus obtained small flat plate sample was measured. The measuring conditions in this case were the same as in measurement of the multi axial impact strength at low temperatures (flat plate). In measurement, the small flat plate was fixed in such a direction as the striker colliding against the convex portion of the curved surface.

The measurement was conducted on 10 small flat plates, and from the respective measured values obtained, average value and standard deviation were calculated. Furthermore, the resulting standard deviation was divided by the average value, and the resulting value was employed as a measure for variation from the average value.

Examples 1-9

The materials mentioned in Table 1 at the proportions given therein were melt kneaded using a co-rotating twin-screw extruder of L/D=46 (ZSK40: manufactured by Coperion K.K., Germany) having one feed opening on the upstream side and a first downstream side feed opening at the position of L/D=23, thereby obtaining resin compositions (Examples 1-9). In this case, polyphenylene ether, polystyrene and partially hydrogenated block copolymer were fed from the upstream side feed opening and polyamide, CuI-master batch, titanium dioxide, carbon black, iron oxide and stabilizer were fed from the first downstream side feed opening.

Among the resin compositions of Examples 1-9, those of Examples 1-3 and 7 were resin compositions satisfying the requirements of the present invention, and those of other examples were comparative resin compositions.

In this case, the cylinder temperature was set at 320° C. from the upstream side feed opening to the first downstream side feed opening, and set at 280° C. after the first downstream side feed opening. The screw rotating speed at the processing was 300 rpm, and the feed rate of each feeder was adjusted so as to give an extrusion rate of about 60 kg/h. In Examples 1-9, the screw configuration was nearly the same as the screw configuration type-H in Examples 10-12 given hereinafter.

TABLE 1

|  | Example 1 | Example 2 | Example 3 | Example 4 | Example 5 | Example 6 | Example 7 | Example 8 | Example 9 |
|---|---|---|---|---|---|---|---|---|---|
| PPE-2 (mass part) | 40 | 40 | 40 | 40 | 40 | 40 | 35 | 35 | 35 |
| polystyrene (mass part) | 0 | 0 | 0 | 0 | 0 | 0 | 10 | 10 | 10 |
| SEBS (mass part) | 10 | 10 | 10 | 10 | 10 | 10 | 5 | 5 | 5 |
| Maleic anhydride (mass part) | 0.3 | 0.3 | 0.3 | 0.3 | 0.3 | 0.3 | 0.3 | 0.3 | 0.3 |
| PA66L (mass part) | 40 | 40 | 40 | 40 | 50 | 50 | 40 | 10 | 50 |
| PA66 (mass part) | 10 | 10 | 10 | 10 | 0 | 0 | 10 | 40 | 0 |
| CuI-master batch (mass part) | 0 | 0.1 | 0 | 0.15 | 0 | 0.3 | 0 | 0 | 0 |
| Iron oxide (mass part) | 0 | 0 | 0.03 | 0 | 0 | 0 | 0 | 0 | 0 |
| Stablizer (mass part) | 0 | 0 | 0 | 0 | 0 | 0 | 0 | 0 | 0.25 |
| Titanium dioxide (mass part) | 0.8 | 0.8 | 0.8 | 0.8 | 4 | 0.8 | 0.8 | 2 | 2 |
| Carbon block (mass part) | 0.02 | 0.02 | 0.02 | 0.02 | 0.1 | 0.02 | 0.02 | 0.05 | 0.05 |
| Copper content (mass part) | 9.9 | 19.8 | 9.9 | 24.7 | No | 29.6 | 9.9 | 39.1 | no |
| Dv/Dn (—) | 4.57 | 4.49 | 4.40 | 4.37 | 4.41 | 4.50 | 4.96 | 5.04 | 4.88 |
| Weight average molecular weight of PPE (—) | 54800 | 55400 | 56000 | 54100 | 55000 | 55100 | 52200 | 51900 | 50900 |
| Changing rate of normal tensile strain at break (%) | −7.4 | −4 | 6 | −10 | −87 | −56 | 12 | −44 | −55 |
| Degree of discoloration after heat treatment (4 grade evaluation) | AAA | AAA | AAA | A | AA~A | B | AAA | B | AAA |
| Changing rate of Izod in retention in molding machine (%) | −23.1 | −16 | −10 | −22 | −63 | −70 | −11 | −30 | −25 |

In Examples 1-9, the content of copper and the amounts of titanium dioxide and carbon black were changed, and it can be seen from the results of Table 1 that when the content of copper exceeded 20 mass ppm (Examples 4, 6 and 8), the discoloration of the molded pieces after heat treatment was great, and the molded pieces containing no copper (Examples 5 and 9) were deteriorated in physical properties.

Examples 10-12

Using a co-rotating twin-screw extruder of L/D=48 (ZSK70MC: manufactured by Coperion K.K.; having 12 temperature control blocks and autoscreen changer blocks) having one feed opening on the upstream side and one first downstream side feed opening at the position of L/D=23, 30 mass parts of PPE-1, 10 mass parts of SEBS and 0.15 mass part of maleic anhydride were fed from the upstream side feed opening and 50 mass parts of PA66L, 10 mass parts of PA66, 0.8 mass part of titanium oxide and 0.02 mass part of carbon black which were dry blended were fed from the downstream side feed opening, followed by melt kneading them to prepare resin compositions.

In Examples 10-12, the compositions of the components of the resin compositions were all the same and only the processing conditions were different. Specifically, in Example 10 (the present invention) and Example 11 (comparative example), only the screw configuration was different. The screw configuration of type-S used in Example 10 was such that kneading element packages [RRNN packages] comprising two clockwise (feeding type) kneading elements and two neutral (retention type) kneading elements were disposed before and after the downstream side feed opening. On the other hand, the screw configuration of type-H used in Example 11 was such that kneading element packages [RRNNNL packages] comprising two clockwise (feeding type) kneading elements, three neutral (retention type) kneading elements and one anti-clockwise (reversion type) kneading element were disposed just before the downstream side feed opening and after the downstream side feed opening, and, furthermore, one anti-clockwise (reversion type) screw element was disposed just after the RRNNNL package disposed before the downstream side feed opening. That is, when type-H and type-S were compared, the type-H had a screw configuration considerably higher in kneading and agitating ability.

Only the screw rotating speed at extrusion differed in Example 11 and Example 12 (comparative example). In the case of megacompounder type extruders such as ZSK70MC, the screw rotating speed is mainly selected from the range of usually 400-1,000 rpm.

TABLE 2

|  | Example 10 | Example 11 | Example 12 |
|---|---|---|---|
| Extrusion conditions |  |  |  |
| Screw design (–) | S | H | H |
| Extrusion rate (Kg/hr) | 900 | 900 | 900 |
| Screw rotating speed (rpm) | 500 | 500 | 800 |
| Copper content (mass ppm) | 9.9 | 9.9 | 9.9 |
| Dv/Dn (–) | 3.34 | 2.35 | 1.89 |
| Weight average molecular weight of PPE (–) | 45300 | 42200 | 45400 |

TABLE 2-continued

|  | Example 10 | Example 11 | Example 12 |
|---|---|---|---|
| Multi axial impact strength at low temperatures (flat plate) |  |  |  |
| Absorption energy (average) (J) | 33.3 | 22.2 | 17.6 |
| Standard deviation (J) | 10.1 | 10.4 | 9.6 |
| Standard deviation/average (–) | 0.303 | 0.468 | 0.545 |
| Multi axial impact strength at low temperatures (curved surface) |  |  |  |
| Absorption energy (average) (J) | 30.1 | 10.6 | 9.1 |
| Standard deviation (J) | 7.5 | 5.6 | 6.4 |
| Standard deviation/average (–) | 0.249 | 0.528 | 0.703 |

It can be seen from the results of Table 2 that even when the compositions of the components of the resin compositions were the same, the ratio Dv/Dn and the weight average molecular weight of polyphenylene ether in the resin composition greatly changed depending on the processing conditions, and the multi axial impact strength at low temperatures also changed. It can be seen that the resin composition of Example 10 which satisfied the requirements of the present invention had a high multi axial impact strength at low temperatures.

Examples 13-17

In Examples 13-16, the same twin-screw extruder as in Example 10-12 was used, and 40 mass parts of PPE-2, 10 mass parts of SEBS and 0.3 mass part of maleic anhydride were fed from the upstream side feed opening and 40 mass parts of PA66L, 10 mass parts of PA66, 0.8 mass part of titanium oxide and 0.02 mass part of carbon black which were dryblended were fed from the downstream side feed opening, followed by melt kneading them to prepare resin compositions. In Examples 13-17, also the compositions of the components of the resin compositions were all the same and only the processing conditions were different. Specifically, in Example 13 (the present invention) and Example 14 (the present invention), only the screw rotating speed was different. In Example 13 and Example 15 (comparative example) and Example 16 (comparative example), only the screw configuration was different. The screw configuration used in Example 13 was type-H as in Example 11, but the screw configuration of type-M used in Example 15 was the same as type-S, except that the kneading element package disposed before the downstream side feed opening was changed to RRNNNL package of type-H. That is, the screw configuration of type-M had a kneading and agitating ability intermediate between that of the type-S and that of type-H. The screw configuration used in Example 16 was type-S.

Furthermore, in Example 17 (the present invention), the same twin-screw extruder as in Examples 1-9 was used, and processing was carried out using screw having screw configuration of type-H under the conditions of a screw rotating speed of 300 rpm and an extrusion rate of 60 kg/h. The composition of resin was the same as in Example 13.

TABLE 3

|  | Example 13 | Example 14 | Example 15 | Example 16 | Example 17 |
|---|---|---|---|---|---|
| Extrusion conditions | | | | | |
| Screw design (–) | H | H | M | S | H |
| Extrusion rate (Kg/hr) | 900 | 900 | 900 | 900 | 60 |
| Screw rotating speed (rpm) | 500 | 800 | 500 | 500 | 300 |
| Copper content (mass ppm) | 9.9 | 9.9 | 9.9 | 9.9 | 9.9 |
| Dv/Dn (–) | 4.94 | 3.86 | 5.52 | 6.09 | 4.57 |
| Weight average molecular weight of PPE (–) | 51900 | 62400 | 58200 | 60400 | 54800 |
| Multi axial impact strength at low temperatures (flat plate) | | | | | |
| Absorption energy (average) (J) | 32.0 | 32.5 | 27.9 | 19.5 | 36 |
| Standard deviation (J) | 13.1 | 13.3 | 12.9 | 9.6 | 9.6 |
| Standard deviation/average (–) | 0.409 | 0.409 | 0.462 | 0.492 | 0.267 |
| Multi axial impact strength at low temperatures (curved surface) | | | | | |
| Absorption energy (average) (J) | 24.8 | 17.9 | 16.2 | 8.4 | 18.6 |
| Standard deviation (J) | 10.2 | 10.3 | 8.8 | 8.1 | 6.4 |
| Standard deviation/average (–) | 0.411 | 0.575 | 0.543 | 0.964 | 0.344 |

It can also be seen from the results of Table 3 on Examples 13-17 that even when the compositions of the components of the resin compositions were the same, the ratio Dv/Dn and the weight average molecular weight of polyphenylene ether in the resin composition greatly changed depending on the processing conditions, and the multi axial impact strength at low temperatures also changed. That is, it can be seen that the resin compositions having the ratio Dv/Dn and the weight average molecular weight of polyphenylene ether in the resin compositions as specified in the present invention had a high and stable (small in standard deviation from average value) multi axial impact strength at low temperatures.

Figure 1:
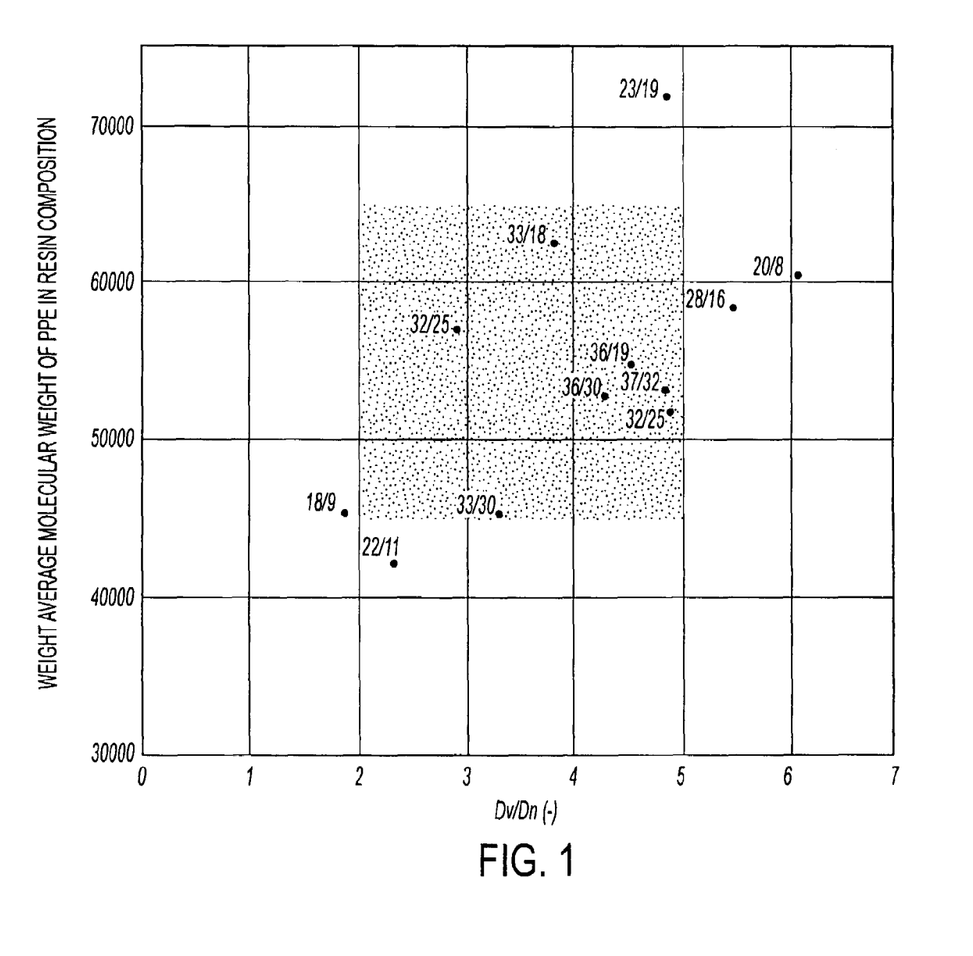
FIG. 1 is a graph in which X-axis shows the measured value of Dv/Dn and Y-axis shows the weight average molecular weight of polyphenylene ether in the resin composition, and multi axial impact strength at low temperatures (flat plate) and multi axial impact strength at low temperatures (curved surface) are given on the plotted points, respectively (the value given on the left side is multi axial impact strength at low temperatures of flat plate test pieces and the value given on the right side is multi axial impact strength at low temperatures of test pieces having curved surface).

In order to show more clearly that the weight average molecular weight of polyphenylene ether in the resin composition and the ratio Dv/Dn have the optimum values, the multi axial impact strength at low temperatures (flat plate) and the multi axial impact strength at low temperatures (curved surface) in Examples 10-17 were shown in a graph in FIG. 1.

Examples 18-22

Using the same twin-screw extruder as in Examples 10-12, PPE-1, PPE-2, PPE-3, PPE-4, SEBS and maleic anhydride were mixed at the proportion shown in Table 4 and fed from the upstream side feed opening, and PA66L and PA66 were mixed at the proportion shown in Table 4 and fed from the downstream side feed opening, followed by melt kneading them to prepare resin compositions (Examples 18-22). In this case, 0.8 mass part of titanium dioxide and 0.02 mass part of carbon black were dryblended with the polyamides (50 mass parts in total) fed from the downstream side feed opening.

The screw configuration at the processing was type-H, and the screw rotating speed was 500 rpm and the feeding amount from each feeder was controlled so as to give an extrusion rate of 900 kg/h. Only in Example 22, the copper content in the resin composition was about 30 ppm.

TABLE 4

|  | Example 18 | Example 19 | Example 20 | Example 21 | Example 22 |
|---|---|---|---|---|---|
| PPE-1 (mass part) | 0 | 0 | 20 | 0 | 0 |
| PPE-2 (mass part) | 0 | 0 | 20 | 40 | 40 |
| PPE-3 (mass part) | 20 | 0 | 0 | 0 | 0 |
| PPE-4 (mass part) | 20 | 40 | 0 | 0 | 0 |
| SEBS (mass part) | 10 | 10 | 10 | 10 | 10 |
| Maleic anhydride (mass part) | 0.3 | 0 | 0.3 | 0.3 | 0.3 |
| PA66L (mass part) | 40 | 40 | 40 | 40 | 20 |
| PA66 (mass part) | 10 | 10 | 10 | 10 | 30 |
| Extrusion conditions | | | | | |
| Copper content (mass ppm) | 9.9 | 9.9 | 9.9 | 9.9 | 29.7 |
| Dv/Dn (–) | 2.94 | 4.93 | 4.89 | 4.94 | 4.32 |
| Weight average molecular weight of PPE (–) | 56900 | 71800 | 53200 | 51900 | 52800 |

TABLE 4-continued

|  | Example 18 | Example 19 | Example 20 | Example 21 | Example 22 |
|---|---|---|---|---|---|
| Multi axial impact strength at low temperatures (flat plate) | | | | | |
| Absorption energy (average) (J) | 32.4 | 23.2 | 38.8 | 32 | 35.7 |
| Standard deviation (J) | 6.3 | 10.1 | 8.2 | 13.1 | 7.7 |
| Standard deviation/average (−) | 0.194 | 0.435 | 0.211 | 0.409 | 0.216 |
| Multi axial impact strength at low temperatures (curved surface) | | | | | |
| Absorption energy (average) (J) | 25 | 19.2 | 31.5 | 14.8 | 29.5 |
| Standard deviation (J) | 4.1 | 6.6 | 6.1 | 10.2 | 7.6 |
| Standard deviation/average (−) | 0.164 | 0.344 | 0.194 | 0.689 | 0.258 |
| Changing rate of normal tensile strain at break (%) | −8 | −9 | −9 | −11 | −14 |
| Degree of discoloration after heat treatment (4 grade evaluation) | AAA | AAA | AAA | AAA | B |
| Changing rate of Izod in retention in molding machine (%) | −14 | −29 | −13 | −18 | −16 |

It can be seen from the results of Table 4 that when the weight average molecular weight of polyphenylene used was changed, the multi axial impact strength at low temperatures and degree of variation of the impact strength were deteriorated in case where the Dv/Dn or the weight average molecular weight of polyphenylene ether in the resin composition was outside the range specified in the present invention. Furthermore, it can be further seen that even when the Dv/Dn or the weight average molecular weight of polyphenylene ether in the resin composition was inside the range specified in the present invention, degree of discoloration after heat treatment increased, if the copper content was outside the range specified in the present invention (see Example 22 (comparative example)).

INDUSTRIAL APPLICABILITY

The resin compositions of the present invention can be used in a wide variety of the fields such as electric and electronic parts, office appliances, vehicle parts, and mechanical parts. Specifically, the resin compositions of the present invention can be suitably used for exterior parts of motorbikes such as cowls, interior parts of automobiles such as blower fan for air-conditioners, and external plates and exterior trim parts of automobiles such as fender, door panel, front panel, rear panel, rocker panel, rear bumper panel, back door garnish, emblem garnish, fuel flapper, over fender, outer door handle, door mirror shell, bonnet air intake, bumper, bumper guard, roof rail, roof rail leg, pillar cover, wheel cover and various aero-parts.

The invention claimed is:

1. A resin composition containing (a) a polyamide; (b) a polyphenylene ether; (c) at least one partially hydrogenated block copolymer; (d) copper; and (e) titanium dioxide and/or carbon black, wherein
the polyphenylene ether (b) in the composition has a weight average molecular weight in the range of 45,000-65,000,
the partially hydrogenated block copolymer (c) is a partially hydrogenated product of an ABA type and/or an ABAB type block copolymer comprising an aromatic vinyl compound block (A) and a conjugated diene compound block (B),
the copper (d) is contained in an amount of 1-20 mass ppm based on the total mass of the resin composition,
the titanium dioxide and/or carbon black (e) are contained in an amount of 0.1-2 mass % based on the total mass of the resin composition,
the polyamide (a) forms a continuous phase, the polyphenylene ether (b) is dispersed in the continuous phase to form a dispersed phase, the partially hydrogenated block copolymer (c) is present in at least one phase selected from the continuous phase of the polyamide (a) and the dispersed phase of the polyphenylene ether (b), whereby when the partially hydrogenated block copolymer (c) is present in the dispersed phase of the polyphenylene ether (b), the partially hydrogenated block copolymer (c) forms a dispersed phase together with the polyphenylene ether (b) and when the partially hydrogenated block copolymer (c) is present in the continuous phase of the polyamide (a), the partially hydrogenated block copolymer (c) singly forms a dispersed phase different from the dispersed phase of the polyphenylene ether (b), and the dispersed phase containing the polyphenylene ether (b) and/or the partially hydrogenated block copolymer (c) dispersed in the polyamide (a) has a ratio (Dv/Dn) of a volume average particle diameter (Dv) and a number average particle diameter (Dn) in the range of 2.0-5.0.

2. A resin composition according to claim 1 which contains the copper (d) in an amount of 1-10 mass ppm based on the total mass of the resin composition.

3. A resin composition according to claim 1, wherein the copper (d) is present in a copper compound represented by the formula:

$Cu_a X_b Y_c$, wherein

Cu represents copper;

X represents a group selected from OH, $CH_3COO$, $SO_4$ and CN;

Y represents oxygen or a halogen; and a, b and c represent an integer of 0-7, with a proviso that a cannot be 0.

4. A resin composition according to claim 1, wherein the Dv/Dn is in the range of 2.5-5.0.

5. A resin composition according to claim 1, wherein the polyphenylene ether (b) in the resin composition has a weight average molecular weight in the range of 45,000-58,000.

6. A resin composition according to claim 1, wherein a mixture of two or more polyphenylene ethers different in weight average molecular weight is used as the polyphenylene ether (b).

7. A resin composition according to claim 1, wherein a mixture of a functionalized polyphenylene ether and an unfunctionalized polyphenylene ether is used as the polyphenylene ether (b).

8. A resin composition according to claim 1, wherein the polyamide (a) is polyamide 6,6.

9. A resin composition according to claim 1 which contains as the polyamide (a) at least two polyamide components of a polyamide containing the copper (d) in an amount of not less than 10 ppm and not more than 150 ppm and a polyamide containing the copper (d) in an amount of not less than 0 ppm and less than 10 ppm.

10. A resin composition according to claim 1 which contains at least one partially hydrogenated block copolymer having a number average molecular weight of 200,000-300,000 as the partially hydrogenated block copolymer (c).

11. A resin composition according to claim 1 which contains a polyphenylene ether copolymer (b-1) of 2,6-dimethylphenol and 2,3,6-trimethylphenol as the polyphenylene ether (b), each monomer unit of the polyphenylene ether copolymer (b-1) comprising 80-90 mass % of 2,6-dimethylphenol and 10-20 mass % of 2,3,6-trimethylphenol based on the total mass of the polyphenylene ether copolymer (b-1).

12. A resin composition according to claim 1, wherein carbon black having a DBP absorption (measured in accordance with ASTM D2414) of not more than 100 cc/100 g is used as the component (e).

13. A resin composition according to claim 1 which additionally contains (f) iron in an amount of not more than 300 mass ppm based on the total mass of the resin composition.

14. A resin composition according to claim 13, wherein the iron (f) is represented by the formula:

$Fe_a X_b Y_c$ (in the above formula, Fe represents iron, X represents a group selected from OH, $CH_3COO$, $SO_4$ and CN, Y represents oxygen or a halogen, and a, b and c represent an integer of 0-7, with a proviso that a cannot be 0).

15. A molded article comprising the resin composition of claim 1.

16. A molded article according to claim 15 which has a curved surface having a radius of 200-400 mm on the outer surface.

17. A molded article according to claim 15 which is a part for vehicles.

18. A molded article according to claim 15 which is an exterior material for vehicles.

* * * * *